No. 803,163. PATENTED OCT. 31, 1905.
H. N. & J. E. HOBART.
GATE.
APPLICATION FILED JAN. 20, 1905.

WITNESSES:
Carl Stoughton
M. B. Ashley

INVENTORS
Horatio N. Hobart,
John E. Hobart,
BY
Theodore Parker
ATTORNEYS

UNITED STATES PATENT OFFICE.

HORATIO N. HOBART AND JOHN E. HOBART, OF COLUMBUS, OHIO; SAID JOHN E. HOBART ASSIGNOR TO SAID HORATIO N. HOBART.

GATE.

No. 803,163.      Specification of Letters Patent.      Patented Oct. 31, 1905.

Application filed January 20, 1905. Serial No. 241,913.

*To all whom it may concern:*

Be it known that we, HORATIO N. HOBART and JOHN E. HOBART, citizens of the United States, residing at Columbus, in the county of Franklin and State of Ohio, have invented certain new and useful Improvements in Gates, of which the following is a specification.

Our invention relates to a new and useful improvement in gates.

The object of the invention is to provide superior means of simple construction for elevating the latch or free end of the gate, so that the latter will clear or pass over obstacles in its path as it is swung, and, furthermore, to provide a suitable latch whereby the gate after being closed may be depressed and held to prevent small animals from passing beneath the gate.

It is also a feature of our invention to so construct the gate that sagging may be taken up or entirely eliminated.

Finally, the object of the invention is to provide a device of the character described that will be strong, durable, efficient, and simple and inexpensive to make and one in which the several parts will not be liable to get out of working order.

With the above and other objects in view the invention consists of the novel details of construction and operation, a preferable embodiment of which is described in the specification and illustrated in the accompanying drawings, wherein—

Figure 1:
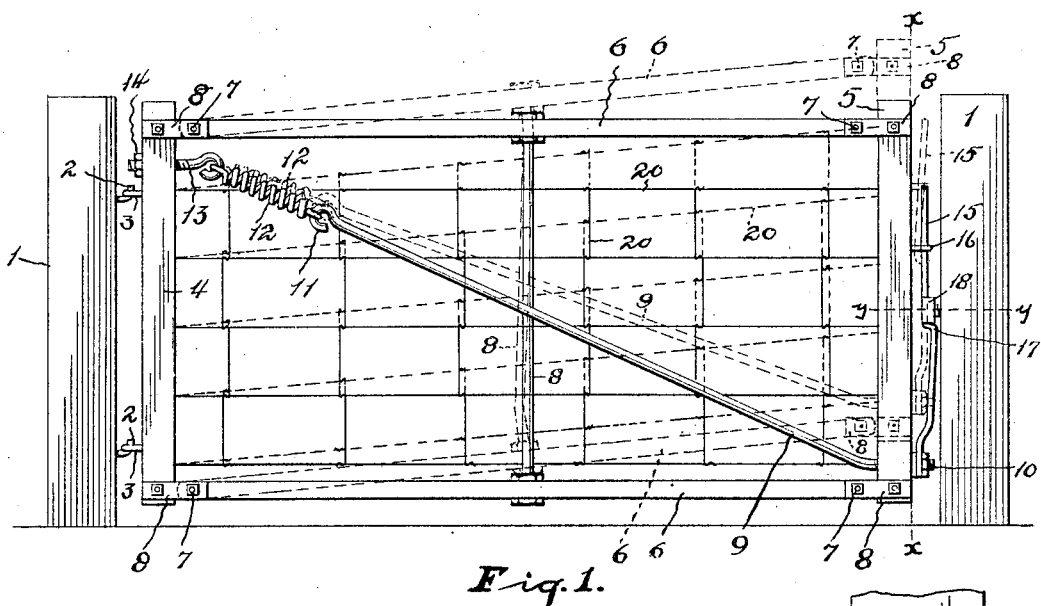
Figure 2:
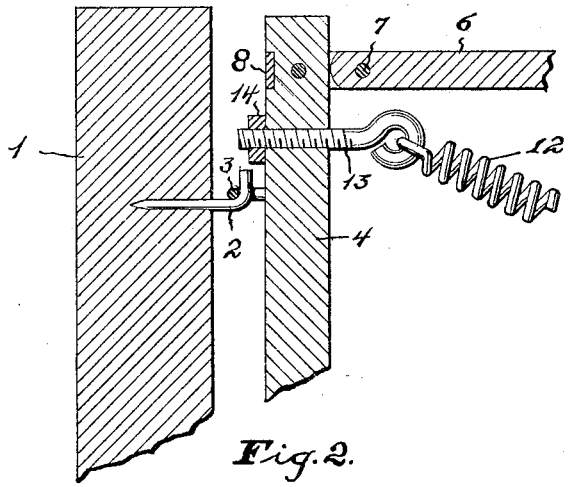
Figure 3:
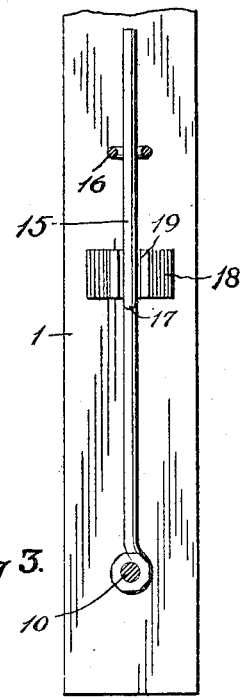
Figure 4:
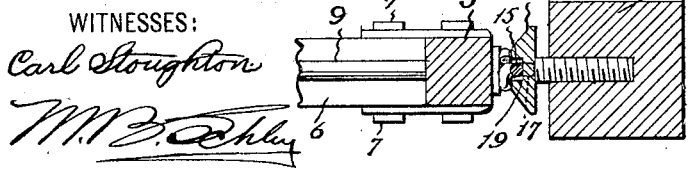

Figure 1 is a side elevation of our improved gate in its depressed position and illustrating in dotted lines its elevated position. Fig. 2 is a vertical sectional view of a portion of the gate and its supporting-post, also illustrating in elevation a portion of the elevating-spring. Fig. 3 is a view in elevation of the latch-post and the latch, showing the latch-supports in vertical section and taken on the line $x\ x$ of Fig. 1; and Fig. 4 is a horizontal sectional view taken on the line $y\ y$ of Fig. 1.

In the drawings the numeral 1 designates the gate-posts, upon one of which the gate is hung, so as to swing by means of any suitable hinges, such as the hooks 2 and staples 3, the latter projecting from the upright rear bar 4 of the gate. The gate is formed with a front or latch bar 5, which is connected at its upper and lower ends with the upright or rear bar 3 by means of upper and lower cross-rails 6. The cross-rails 6 are supported at each end upon pivot-bolts 7 between the free ends of yokes 8, which support the pivot-bolts, and are rigidly secured upon the bars 4 and 5, which they embrace. The rails 6 are rounded at each end, as best shown in Fig. 2, so as to allow them a limited swinging movement in relation to the bars 4 and 5. A vertical rod 8 connects the rails 6 centrally of the gate, so as to brace the gate; but it is to be understood that the said rod is of such resiliency as to slightly bend and allow the rails a free movement.

For elevating the gate and supporting the same we provide a diagonally-disposed rod 9, which is bent at an angle at its lower end and passes through the lower portion of the latch-bar 5, beyond which it projects to form a stud 10, which will be hereinafter referred to. The rod 9, as before stated, being diagonally disposed, is formed at its upper and outer end with a hook member 11 and terminates some distance from the upper rear corner of the gate. A stout coiled spring 12 is engaged at one end with the hook member 11 and at its opposite end with a hook-bolt 13, which is screw-threaded and passed through the bar 4, projecting a sufficient distance from the rear side thereof, so as to receive a nut 14, by which the said screw-hook may be adjusted. It is apparent that by turning the nut 14 in opposite directions the spring 12 may be either tightened or loosened, and thus the degree of elevation of the gate regulated. The spring is normally placed under sufficient tension, so that together with the rod 9 the gate will be held in the raised position, (shown in dotted lines in Fig. 1,) thus causing it to clear or pass over obstacles in its path when it is swung open or closed.

For holding the gate in position we provide a vertical spring latch member 15, which is supported on its lower end by the stud 10, hereinbefore mentioned, and projects at its upper end through and some distance above a staple 16. The upper or projecting end of the latch affords a handle by which it may be pressed toward the bar 5, the staple 16 acting as a guard to prevent displacement. The lower portion of the latch is formed with an offset or bent portion, so as to provide a shoulder 17, which is adapted to engage under a suitable latch member 18, provided in its central portion with a vertical groove 19 of sufficient depth and width to receive the latch.

It is obvious that when the shoulder 17 is engaged under the latch member 18, as shown in Figs. 1, 3, and 4, the gate will be held in its lowered or depressed position, as shown in Fig. 1. It is to be understood, however, that the latch 15, being of spring metal, will have a tendency to spring outward and always engage in the groove 19, and thus when the gate is in its elevated position, as shown in dotted lines in Fig. 1, the latch 15 or its offset portion will engage in the groove 19, the shoulder 17 standing above the latch member 18, as is also shown in dotted lines in Fig. 1. When it is desired to depress the gate to its lowered position, it is merely necessary to bear firmly upon the bar 5, which will cause the latch 15 to ride down the groove 19 until the shoulder 17 springs under the latch member 18 and securely holds the gate in position. It is desirable to have the gate depressed when small animals are kept adjacent thereto, so as to prevent them from passing beneath the lower rail 6.

Any form of stay and strand wires 20 may be stretched between the parts of the gate.

The gate may be readily opened by grasping the upper end of the latch 15 and pressing it toward the bar 5, so as to withdraw it from the groove 19 of the latch member, and then swinging the gate to either side, the spring 12 and rod 9 elevating the free end of the gate, causing it to clear any obstacles which may be in its path.

Having now fully described our invention, what we claim, and desire to secure by Letters Patent, is—

1. The combination with a flexible gate, the gate-posts, and resilient means for elevating the gate, of a spring-latch having a shoulder, and a latch member carried by one of the gate-posts and adapted to be engaged by the latch when the gate is in its elevated position and by the shoulder of the latch when the gate is depressed.

2. The combination with a wire-fence gate and the gate-posts, of a rod disposed diagonally on the gate and having its lower end rigidly secured to the lower corner of the swinging end of the gate, a coiled spring connecting the upper end of the rod with the upper inner corner of the gate for automatically elevating the gate, the said gate being adapted to be depressed, means for adjusting the spring to vary the elevation of the gate and a spring-latch adapted to engage one of the gate-posts for fastening the gate in either its elevated or depressed position and so constructed as to lock the gate in its depressed position against elevation.

3. A gate comprising end bars, cross-rails pivotally secured to the end bars, wires extending between the end bars, resilient means for elevating the swinging end of the gate disposed diagonally between the end bars and connected thereto, and an adjustable device connecting the resilient means and one of the end bars for adjusting the said resilient means.

In testimony whereof we affix our signatures in presence of two witnesses.

HORATIO N. HOBART.
JOHN E. HOBART.

Witnesses:
A. L. PHELPS,
M. B. SCHLEY.